US006233373B1

(12) United States Patent
Askins et al.

(10) Patent No.: US 6,233,373 B1
(45) Date of Patent: May 15, 2001

(54) OPTICAL SPECTROMETER WITH IMPROVED GEOMETRY AND DATA PROCESSING FOR MONITORING FIBER OPTIC BRAGG GRATINGS

(75) Inventors: Charles G. Askins, Upper Marlboro, MD (US); Martin A. Putnam, Cheshire, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/337,159

(22) Filed: Jun. 21, 1999

(51) Int. Cl.$^7$ .................................................. G02B 6/02

(52) U.S. Cl. ............................. 385/12; 385/10; 385/37; 356/451; 356/478

(58) Field of Search ............................. 385/10, 12, 15, 385/37; 356/477, 478, 481, 517, 451

(56) References Cited

U.S. PATENT DOCUMENTS

| | | | |
|---|---|---|---|
| 5,680,489 | 10/1997 | Kersey | 385/12 |
| 5,719,672 | 2/1998 | Chien | 356/328 |
| 5,784,507 | 7/1998 | Holm-Kennedy et al. | 385/14 |
| 5,801,831 | 9/1998 | Sargoytchev | 356/346 |
| 5,838,437 | * 11/1998 | Miller et al. | 356/345 |
| 5,987,197 | * 11/1999 | Kersey | 385/24 |
| 6,061,129 | * 5/2000 | Ershov et al. | 356/328 |
| 6,097,487 | * 8/2000 | Kringlebotn et al. | 356/345 |
| 6,118,530 | * 9/2000 | Bouevitch et al. | 356/308 |

OTHER PUBLICATIONS

Zhou et al., "High pressure fiber optic light scattering spectrometer", *Rev. Sci. Instr.* 69 (5) 1955–60 (May 1998).

Davis et al., "Application of a Fiber Fourier Transform Spectrometer to the Detection of Wavelength–encoded Signals from Bragg Grating Sensors", *J. Lightwave Tech.* 13 (7) 1289–95.

Kersey et al., "Multiplexed fiber Bragg grating strain–sensor system with a fiber Fabry–Perot wavelength filter", *Optics Lett.* 18 (16) 1370–72 (Aug. 15, 1993).

* cited by examiner

*Primary Examiner*—Hemang Sanghavi
*Assistant Examiner*—Jennifer Doan
(74) *Attorney, Agent, or Firm*—John J. Karasek; Jane B. Marciniszyn

(57) ABSTRACT

An aspect of the present invention is an optical spectrometer for detecting a spectral signature of a input optical signal, including: (a) a collimating lens having an optical axis and focal plane, for collimating the input optical signal; (b) an input optical system, for directing the input optical signal to the collimating lens; (c) a diffraction grating, for scattering the collimated input optical signal, positioned in the path of collimated light from the collimating lens, oriented to reflect a majority of the scattered light through the collimating lens; and (d) a detector, in a focal plane of the collimating lens. Another aspect of the invention is a fiber-based sensing system using the optical spectrometer of the invention. Such a system will include (a) an optical fiber having an array of fiber Bragg gratings, where each of the gratings is reflective at a selected wavelength; (b) a light source, for radiating light at each of the selected wavelengths, optically coupled to the optical fiber; and (c) the optical spectrometer of the invention, optically coupled to the optical fiber, for detecting a spectral signature of reflected light from the fiber Bragg gratings. Typically, the spectrometer output will be fed to a data capturing system, and subsequently to a data analysis system, which may combined in a single computer system for control, data capture.

26 Claims, 4 Drawing Sheets

PIXEL # n-4  n-3  n-2  n-1  n  n+1  n+2  n+3  n+4

PIXEL# n-4  n-3  n-2  n-1  n  n+1  n+2  n+3  n+4

ODD-NUMBERED SET

CENTROID RESULT          MEAN ABCISSA OF DATA SET

EVEN NUMBERED SET

MEAN ABCISSA OF DATA SET          CENTROID RESULT

OPTICAL SPECTROMETER WITH IMPROVED GEOMETRY AND DATA PROCESSING FOR MONITORING FIBER OPTIC BRAGG GRATINGS

BACKGROUND OF THE INVENTION

1. Field of the Invention

The present invention relates generally to optical spectrometry, and more particularly to optical spectrometers for use with distributed arrays of fiber optic Bragg gratings (FBGs), for use in such applications as strain sensing, temperature sensing, and other sensing systems for which distributed FBG arrays may be used.

2. Description of the Related Art

Optical spectrometers analyze light signals by measuring the intensity of the light over a range of wavelengths. Optical spectrometers are often used in conjunction with FBG arrays to detect the various light wavelengths that are reflected by the individual gratings in an FBG array.

An FBG array is a length of optical fiber with reflective gratings written into the fiber at intervals. Typically, the gratings in an array will have various peak reflectance wavelengths (the wavelength at which the grating reflects the maximum amount of light back to the source). The peak reflectance of a grating will change, however, as the grating stretches or contracts, typically due to thermal expansion or mechanical strain. By monitoring these changes, one can monitor how the environment is affecting the FBGs, and thereby deduce such things as temperature or strain at the FBG. The wavelengths of light reflected from an FBG array is therefore an optical signal to be analyzed. Typical optical spectrometers for use in conjunction with FBG arrays in these applications are slow and optically inefficient, requiring strong light signals, and have only moderate wavelength resolution.

Two types of optical spectrometers are generally available: serial spectrometers and parallel spectrometers.

Serial spectrometers scan sequentially through a range of wavelengths. They are inherently slower, and at risk for time-dependent errors, but may be more compact than parallel spectrometers.

However, they are inherently inefficient, because only a tiny portion of the employed wavelength range is collected at any time.

Parallel spectrometers have the advantages of optical collection efficiency (in that a large wavelength band is analyzed at any given time) and speed (i.e., data sampling rate), in that they can analyze a broad range of optical wavelengths simultaneously. A typical spectrometer is shown in U.S. Pat. No. 5,719,672 to Chien et al.

There are several drawbacks to applying conventional parallel spectrometers for use with FBGs. One of the disadvantages is the tradeoff between size and resolution. Another is the relatively poor optical-to-electrical efficiency (electrical signal/photon of input light), dynamic range, and speed that most of them achieve.

Previously, the data from parallel spectrometers has been analyzed by using a simple weighted average, or a simple variation of a simple weighted average, to identify spectral peak positions. This can result in appreciable errors in the presence of noisy data. A better method, preferably one permitting resolution down to $1/100$th to $1/1000$th of a pixel, and less sensitive to noise, is desired.

SUMMARY OF THE INVENTION

Accordingly, it is an object of this invention to provide an optical spectrometer with an improved geometry, to allow for a more compact configuration.

It is a further object of this invention to provide a fast, sensitive, and optically efficient spectrometer, with sub-pixel resolution and high dynamic range.

These and additional objects of the invention are accomplished by the structures and processes hereinafter described.

An aspect of the present invention is an optical spectrometer for detecting a spectral signature of an input optical signal, including: (a) a highly corrected lens, for collimating the input optical signal and for focusing dispersed light from the grating onto the detector array; (b) an input optical system, for directing the input optical signal to the collimating lens, in the focal plane and near the optical axis of the lens; (c) a diffraction grating, for dispersing the collimated input optical signal, positioned in the path of collimated light from the collimating lens, oriented to diffract a majority of the dispersed light back through the collimating lens; and (d) a detector, in the focal plane of the collimating lens, and preferably centered on its optical axis.

Another aspect of the invention is a fiber-based sensing system using the optical spectrometer of the invention. Such a system will include (a) an optical fiber having an array of fiber Bragg gratings, where each of the gratings is reflective over a narrow wavelength band, typically less than $1/10,000$ of the center wavelength, more typically on the order of about $1/16,000$ of the center wavelength; (b) a light source, for radiating light that encompasses each of the selected wavelengths, optically coupled to the optical fiber; and (c) the optical spectrometer of the invention, optically coupled to the optical fiber, for detecting a spectral signature of reflected light from the fiber Bragg gratings. The FBG-based sensing system may be used to measure strain, temperature, or any other measurand for FBG-based sensing systems. Selection of individual gratings in the array may be achieved by time-domain selection, frequency-domain selection, or combinations of the two. Typically, the spectrometer output will be fed to a data capturing system, and subsequently to a data analysis system, which may combined in a single computer system for control, data capture, and analysis.

Another aspect of the invention is a method for analyzing stage signal data, such as data from a spectrometer, to achieve sub-pixel resolution, by computing a compounded centroid for this data.

Another aspect of the invention is a time division multiplexed method of operating the fiber-based sensing system of the invention.

BRIEF DESCRIPTION OF THE DRAWINGS

A more complete appreciation of the invention will be obtained readily by reference to the following Description of the Preferred Embodiments and the accompanying drawings in which like numerals in different figures represent the same structures or elements, wherein.

DETAILED DESCRIPTION OF THE PREFERRED EMBODIMENTS

Figure 1:
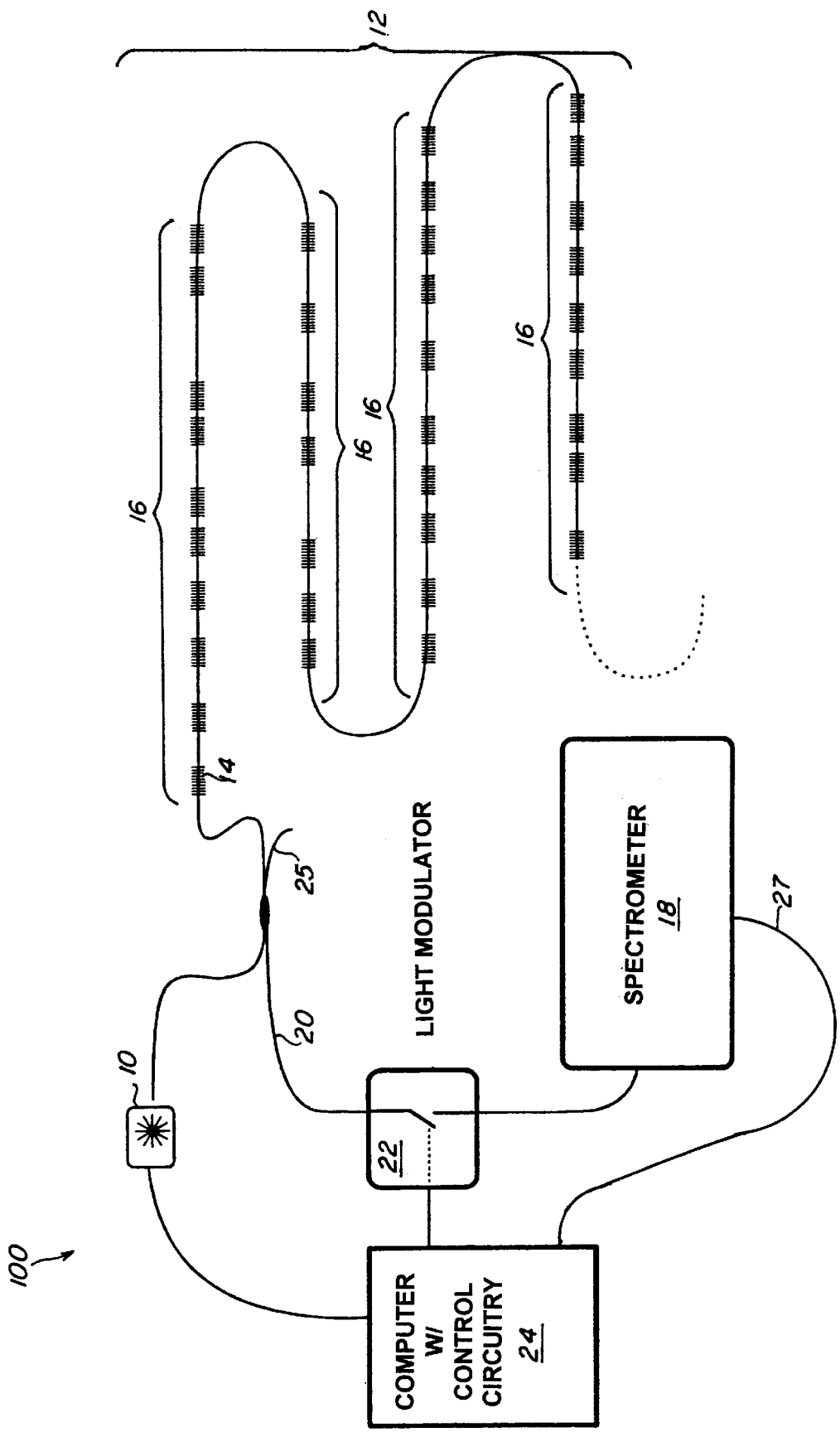
FIG. 1 is a schematic of a FBG based sensing system according to the invention.

Referring to FIG. 1, an FBG-based sensing system 100 has a light source 10 optically coupled to an array 12 of reflective gratings 14. The array 12 may optionally be subdivided into sub-arrays 16 of gratings 14. Different methods may be used to distinguish sub-arrays than are used to distinguish gratings within a sub-array. For instance, sub-arrays 16 may be distinguished from each other in the time domain, while individual gratings 14 within a sub-array 16 may be distinguished in the frequency domain. If the frequency domain is used to distinguish gratings, then at least some gratings must have different peak wavelengths than other gratings (if some gratings have the same peak wavelength, some other method must be used to distinguish them).

The FBG array is optically coupled to the spectrometer 18 through a length of connecting fiber 20. In embodiments of the invention using time-gated detection, a light modulator 22 typically will be used, and the light source 10 typically will be pulsed. A computer with associated dedicated control circuitry 24 typically is used for control functions, for data collection, and for data analysis, which may be performed in real-time or subsequently, and is connected to the spectrometer through electrical cabling 27.

The spectrometer 18 will identify peaks in the signal reflected from the array 12 (the spectrometer input signal) over time, over a wavelength range, or over both.

Figure 2:
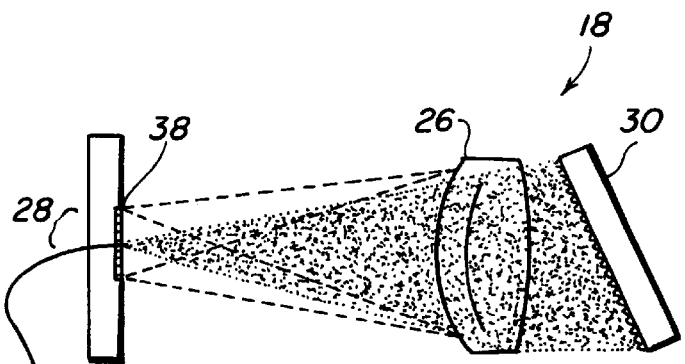
FIG. 2 is a side view of an embodiment of a spectrometer according to the invention.

Referring to FIG. 2, a spectrometer 18 according to the invention will have a highly corrected lens 26 for collimating the input signal and focusing the dispersed signal, an input optical system 28 for directing the input optical signal axially to the collimating lens 26, a diffraction grating 30 for dispersing the collimated input optical signal, positioned in the path of collimated light from the collimating lens, oriented to return a majority of the dispersed light back through the collimating lens (Littrow configuration, preferably at or near the blaze angle); and a detector array 38, near the optical axis, and in the focal plane of, the collimating lens.

One sees that this configuration is inherently less aberrating and simpler and more compact than the conventional spectrometers in use, since it obviates the need for additional focusing and imaging optics, and long path lengths used in those spectrometers.

The selection and configuration of the collimating lens, the detector, and the grating should be made with care, in light of these teachings, to secure all the advantages of the invention. In particular, the size and the optical efficiency of the spectrometer will both be improved by carefully selecting and configuring the components of the spectrometer.

Typical parallel spectrometers must overcome aberrations intrinsic to their design by large path lengths and CCD detector arrays with large pixels. The pixels have tended to be tall in the vertical (y-axis) direction perpendicular to the dispersing direction, because the optics in use produce highly elongated spots, and to use shorter detectors would mean sacrificing as unused any of the light that did not strike the CCD. Tall CCD pixels decrease the optical-to-electrical efficiency of the device, since for a given fluence of light the electrical signal produced by a CCD pixel is inversely proportional to its area.

The CCDs used in optical spectrometers also typically have used pixels that were wide along the x-axis parallel to the dispersing direction. As with tall pixels, wide pixels reduce the optical-to-electrical efficiency, and require a wide imaging area. A consequence of this configuration is that a significant portion of the signal striking the detector will be far from the axis of the lens focusing the light on the detector. This is a problem, because distortion increases as the focused image moves further off-axis.

It has been found that quite small CCDs—not more than 30 $\mu$m tall and pixels not more than 13 $\mu$m wide—work very well for the present invention. Such small CCDs will provide a large electrical signal from a small amount of light.

The diffraction grating used for dispersing the collimated input light should be selected with appropriate line spacing and blaze angle so that the diffraction angle nearly coincides with the blaze angle over the used wavelength range. The grating is placed in Littrow configuration, so that incident light traveling parallel to the axis of the lens will be primarily diffracted back symmetrically about the lens axis.

The collimating lens used in the present invention should take light transmitted from the input signal source, collimate it and transmit it to the diffraction grating at the blaze angle, and take light from the grating and focus it on the detector, which should be positioned as near as possible to the input signal source (both should be axial to and in the focal plane of the collimating lens). A preferred lens according to the invention will focus collimated light to spots smaller than about 15 $\mu$m diameter over at least a 5 mm diameter field and over a spectral band of at least 40 nm, with an aperture of less than 40 mm and a focal length less than 100 mm.

The input signal source should be point-like and, as noted above, as close as possible (within 500 $\mu$m) of the detector, so that the input signal light and the light reaching the detector both travel symmetrically with respect to the collimating lens's axis.

Figure 3:
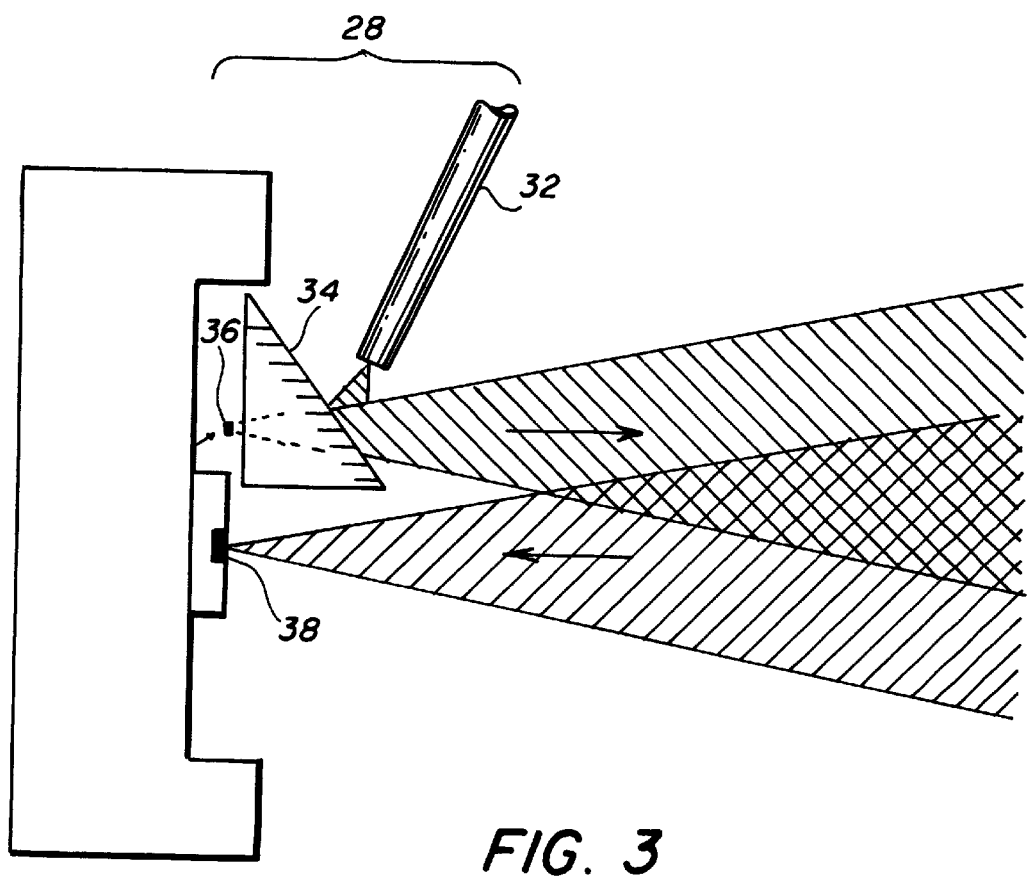
FIG. 3 is an enlarged detail view of an embodiment of a spectrometer according to the invention.
Figure 4:
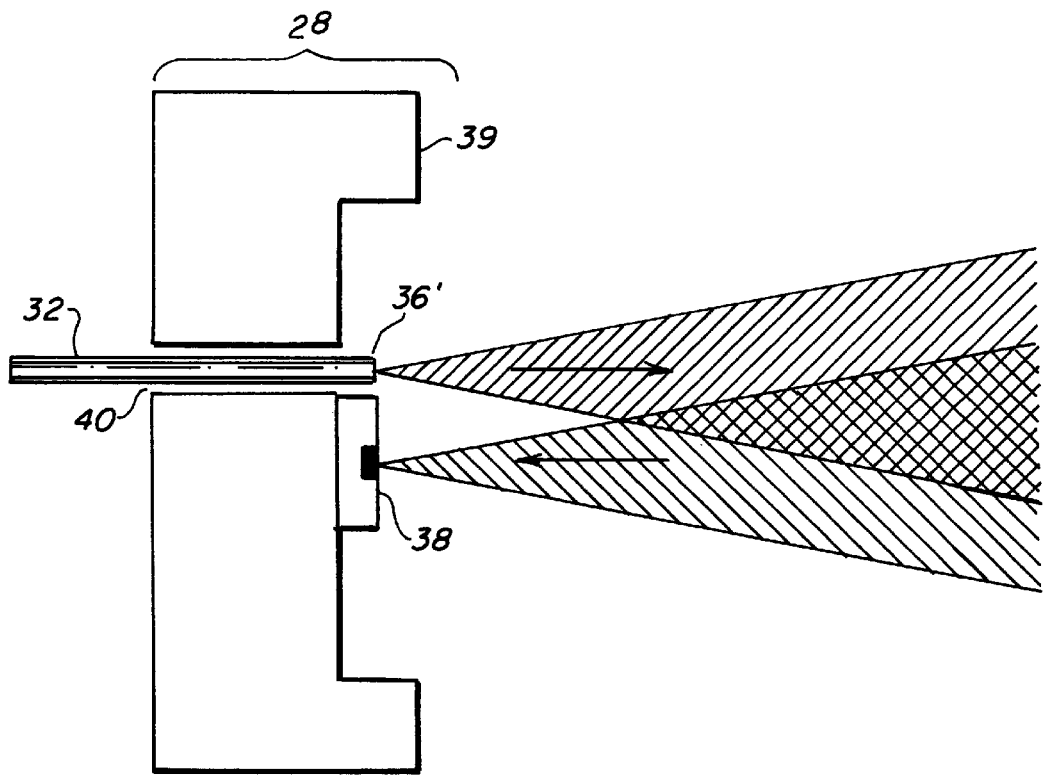
FIG. 4 is an enlarged detail view of another embodiment of a spectrometer according to the invention.

Two preferred geometries for the input signal source are depicted in FIGS. 3 and 4, each of which are sectional views along the x-axis of the detector (i.e., side views if the position of the input optical source is taken to be above the detector). Both of these geometries provide a diffraction-limited point-like input, and minimized aberrations.

Referring to FIG. 3, in this embodiment, the input optical system 28 includes an input single mode optical fiber 32 carrying the signal from the FBG array. The light from this input optical fiber is directed at a mirror 34 positioned preferably just above the surface of, and near the center of the CCD chip carrier package, to reflect the input light about the axis of the collimating lens (not shown). Because of the positioning of the mirror, the input optical signal has an apparent point source 36 coplanar with and in close proximity to the detector array 38, and nearly axial (preferably as close as possible to axial) to and in the focal plane of the collimating lens. The input optical system 28 is configured so that the light from it travels antiparallel to the light traveling to the detector, as shown by the arrows.

Referring to FIG. 4, in this embodiment, the input optical system 28 also includes an input single mode optical fiber 32 carrying the signal from the FBG array. The input optical fiber passes through an aperture 40 in the chip carrier package 39 in the spectrometer, and the end of the fiber 36' is positioned to serve as a point source for the input optical signal, coplanar with and in close proximity to the detector array 38, and nearly axial to and in a focal plane of the collimating lens. The input optical system 28 is configured so that the light from it travels antiparallel to the light traveling to the detector, as shown by the arrows.

Conventional data analysis for achieving good spectral with parallel spectrometers assumes that the optical signal is widely dispersed over a large number of pixels, with only a small range of wavelengths collected by each pixel. However, in the spectrometer of the invention, each pixel may collect a moderate range of wavelengths. To obtain a high spectral resolution, the present invention includes in a preferred embodiment an improved method for resolving the center position of spectral peaks in data collected from a CCD (charge coupled device), CCPD (charge coupled photodiode), or other similar optical detectors that detect varying optical intensities at discrete stages along a geometric axis. It should be noted, however, that this technique is useful not only for optical data collected by a CCD, but also for other data sets comprising isolated peaks distributed along a linear axis, where this linear axis is divided into discrete stages. Data of this type is referred to herein as "stage signal data". Data from a CCD, CCPD, or other similar optical detector array, is representative of the general class of stage signal data.

The spectral image returned to the detector from the FBG array typically includes one narrow wavelength band per FBG. Preferably, the FBG array is configured so the wavelength gap between gratings in the array is wider than the bandwidth of the signal from a particular grating. Because the spectrometer is configured so that wavelength is in a fixed relationship to pixel position (a given pixel detects a fixed wavelength band), the instantaneous central Bragg wavelength of each FBG can be calculated from the pixel coordinate where its signal is centered. The pixel spacing for a typical CCD will usually correspond to a greater wavelength range than that of the FBG's spectral width. A slight intentional de-focusing will smoothly distribute the signal from a particular FBG over a few (preferably between 2 and 10, more preferably between 3 and 5) adjacent pixels.

Previously, sub-pixel resolution was achieved by computing the centroid (weighted average) of the pixel data. For sequential pixels i=n through m, the centroid is given by:

$$\text{centroid} = \frac{nR_n + (n+1)R_{n+1} + \ldots + mR_m}{R_n + R_{n+1} + \ldots + R_m}$$

where $R_i$ is the signal from the ith pixel. According to this formula, an imaged spot centered between pixels 3 and 4 will give a centroid value of 3.5.

This "single centroid" method provides a smooth, highly linear fit as the centroid moves across pixel boundaries. However, by including the contribution of low-amplitude pixel signals, the result becomes highly sensitized to amplitude noise in the data. The data processing algorithm of the invention mitigates or eliminates this problem by appropriately combining a weighted series of solutions which alternately over-or under-estimate the correct answer.

Figure 5A:
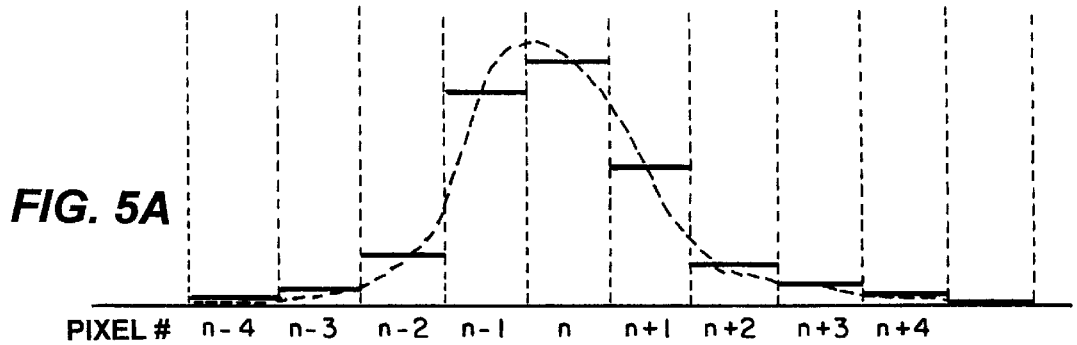
FIGS. 5A through 5D are plots showing selected data from CCD pixels, and values calculated therefrom, for illustrating the data processing method of the invention.
Figure 5B:
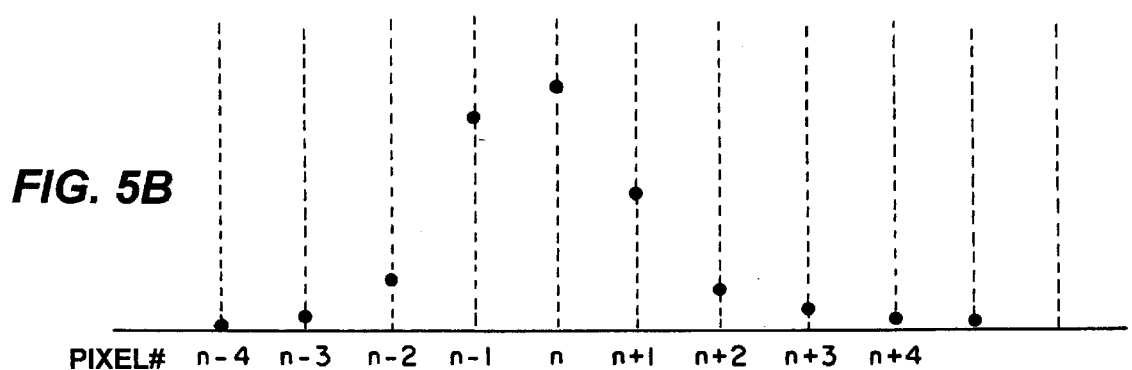

Referring to FIG. 5A, an optical signal (indicated by the dashed curved line) incident on a CCD is depicted as overlapping several adjacent pixels whose boundaries are indicated by the vertical dotted lines. Each pixel within this range will generate a response, indicated by the solid horizontal lines, reflecting the integrated optical signal over that pixel. FIG. 5B plots the signals registered by these pixels for that incident optical signal, each amplitude paired with an abscissa indicated by a dotted line corresponding to the center position of each pixel.

In the improved "compounded centroid" method of the invention, multiple centroids are calculated as with the single centroid, but using only strong signals from the data set to mitigate or eliminate intensity noise errors. A weighted average of these values gives the final result. Several subsets of data are treated, half (±1) containing an odd number of consecutive data points and the remainder containing an even number of consecutive data points, at integer positions. The number of points in all odd-numbered data sets is fixed to be either one greater than or one less than the number in the even numbered data sets. The range of data used should encompass about 90% of the total signal.

Figure 5C:
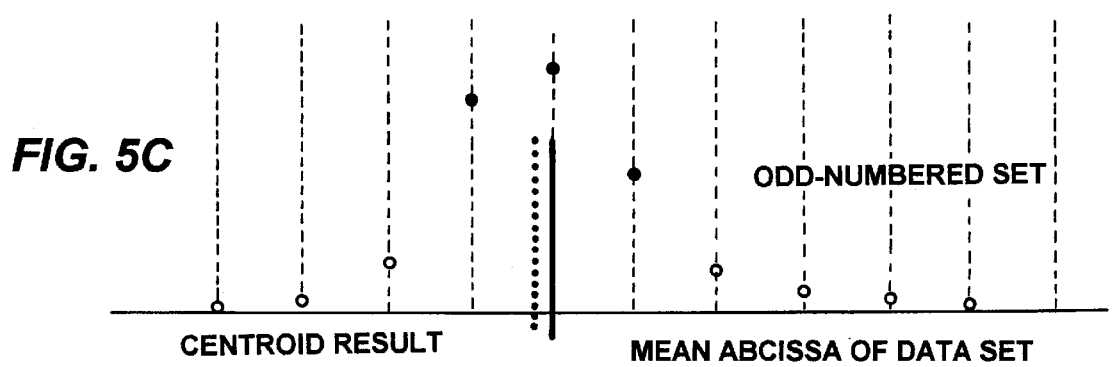
Figure 5D:
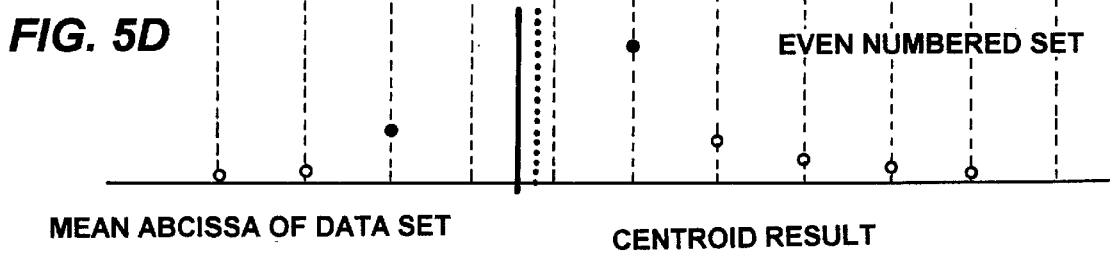

FIG. 5C shows an odd number of selected data points. The centroid estimated with these data is indicated by the bold vertical dotted line, and the mean abscissa M of the data points is an integer, shown as the bold solid vertical line. Likewise, FIG. 5D shows an even number (four) of selected data points. The centroid estimated with these data is indicated by the bold vertical dotted line, and the mean abscissa M of the data points is shown as the bold solid vertical line. Even-numbered data sets will have a mean abscissa value that is an odd multiple of 0.5.

The method of the invention for computing a compounded centroid for stage signal data (such as data from a CCD), having N discrete abscissa values, each abscissa value having a corresponding ordinate value, has the steps:

(a) determining the single centroid for the stage signal data;

(b) selecting a stage W closest to the centroid;

(c) selecting a number of data points O for an odd numbered data set;

(d) selecting a number of data points E=O±1 for an even numbered data set;

(e) selecting a number n of contiguous subsets of the stage signal data, where each of the n subsets has an average abscissa value $M_n$ a centroid $C_n$, and a difference $D_n = C_n - M_n$, where half (±1) of the subsets have E elements and the remainder of the subsets have O elements, where a first subset n=1 of the stage signal data having O elements has an average abscissa value $M_1 = W$, where a second subset of the stage signal data having E elements has an average abscissa value $M_2 = W+0.5$ if $C_1 - M_1 \geq 0$, $M_2 = W - 0.5$ if $C_1 - M_1 < 0$;

(f) computing a compounded centroid for the stage signal data $C_0$, where $$C_0 = \frac{\left(\frac{C_1}{|D_1|^r} + \frac{C_2}{|D_2|^r} + \ldots + \frac{C_n}{|D_n|^r}\right)}{\left(\frac{1}{|D_1|^r} + \frac{1}{|D_2|^r} + \ldots + \frac{1}{|D_n|^r}\right)}$$

where r is a preselected scaling factor and where each value for D is restricted to be not less than some preselected value.

The set of even and odd centroids may be calculated in any order, but for purposes of illustration an arbitrary particular order will be used for illustration. A whole number W which is closest to the single centroid result is used to select the central index of the first odd data set. Its centroid is denoted $C_1$. The magnitude of the difference is $|D_1|=|C_1-M_1|$. If $D_1$ is positive or zero, then an even centroid centered at W+0.5 is computed to yield $C_2$ and $D_2$. An odd centroid centered at W+1, and an even centroid centered at W−0.5 are computed to obtain $C_3$, $D_3$, $C_4$, and $D_4$. If $C_1-M_1$ is negative, a similar set of even and odd centroids would be computed with their mean abscissas 0.5 less than the previously computed set.

These four centroids have mean abscissas which are the nearest possible to the weighted average of the data set. Each centroid is calculated from data points which are asymmetrically grouped about the true center, and each estimation bears an error in proportion to its degree of asymmetry. Four centroid estimates have proven sufficient in most cases. The estimates are then combined, with the contribution from each centroid scaled by a measure of its asymmetry represented by the derived D values:

$$C_0 = \frac{\left(\frac{C_1}{|D_1|^r} + \frac{C_2}{|D_2|^r} + \ldots + \frac{C_n}{|D_n|^r}\right)}{\left(\frac{1}{|D_1|^r} + \frac{1}{|D_2|^r} + \ldots + \frac{1}{|D_n|^r}\right)}$$

$C_0$ may be used as a starting value for W when repeating the procedure. A value near 1.2 for the radical r has been found empirically to give appreciably improved linearity compared to other values. In practice, $D_x$ is prevented from assuming very small values to prevent overflow errors. This "compounded centroid" removes discontinuities at pixel boundaries, and is less affected by noise than is the simple centroid calculation. When the initial data has a signal-to-noise ratio of 200:1 or less, the compounded centroid exhibits less than three times the noise of the single centroid calculation. Background subtraction and pixel-response scaling can be performed to remove minor non-uniformities intrinsic to detector arrays, and enhances the results obtained with the centroid algorithms.

The very fine wavelength resolution provided by this method permits the use of a spectro-meter with moderate dispersion over a moderate number of pixels.

To enhance the ability of the invention to monitor many FBG-based sensors in an array (i.e., to work with larger arrays), it is desirable to add temporal selectivity to the wavelength selectivity described above. This permits one to distinguish between arrays that have the same reflective wavelength, but are positioned apart from each other along the FBG array fiber. For instance, referring back to FIG. 1, the FBG array may be arbitrarily divided into sub-arrays, where each sub-array has gratings of unique reflective wavelengths, but gratings in other sub-arrays may have the same wavelength as a given grating within a given sub-array.

In the past, temporal selectivity through time-division multiplexing (TDM) of signals from FBG arrays has been performed with serial detection, which permits sampling only one portion of the spectrum per light pulse. With the present invention, a single pulse permits sampling the entire spectrum. Reducing the number of pulses for a sampling cycle is particularly advantageous for very large FBG arrays, such as may be used for large engineering projects (bridges, tunnels, etc.). Con-sider for instance an FBG array with gratings spanning 1 km of optical fiber. To get reasonable wavelength resolution, 10,000 to 60,000 pulses of light typically will be required to sample the entire spectrum once, with each pulse traversing 1 km of fiber twice before the next pulse is launched. This corresponds to about a 1 Hz sampling rate, far slower than may be needed for many applications. Compounding this problem is that one almost always needs to perform signal averaging with TDM.

With the present invention, however, the ability to observe the full spectrum with each light pulse can easily provide kHz scale sampling rates. Signal averaging becomes much more reasonable with this speed.

TDM is accomplished through the use of three features: (1), a pulsed light source to illuminate the FBG arrays; (2), the ability to rapidly turn the photo-response of the spectrometer on and off at precise times after the source is pulsed (optical gating); and (3) the proper timing of the photo-response relative to the light pulse. One version of the invention is shown in FIG. 1 with the spectrometer, the light modulator, the pulsed, broadband source, timing circuitry, and arrays of FBGs placed at different positions along the optical fiber (alternatively, the spectrometer may be designed to allow optical gating of the dispersed image at the detector array, as with a voltage-gated microchannel-plate intensifier). The instrument is initially made unresponsive to light. A pulse of broadband light is launched into the fiber with a pulse duration which is less than the time required for light to travel between any two gratings which reflect near the same wavelength. Over the time that reflected light from a selected set of wavelength-multiplexed sensors arrives at the detecting spectrometer, the instrument is made responsive to light, after which it is again made unresponsive. The detector array acts as a low-noise, high sensitivity integrator of optical power from one or many time-gated pulses before the accumulated electrical signal is processed. Using the detector array as a signal integrator, by simply allowing signals from successive pulses to accumulate on the detector, obviates the need for a faster (and therefore probably noisier) detector, and electronic integration.

One method for time-selective photo-response under electronic control can be accomplished by placina a fiber-coupled electro-optic modulator (EOM) before the spectrometer. In addition to enabling the basic TDM function, the EOM can be operated to compensate for unequal signal strength arising from non-uniform FBG reflectivity, source spectral variation, and cumulative transmission losses. Spectral non-uniformity can be compensated by varying the modulation depth of the EOM in synchrony with the arrival time of signals encoded at different wavelengths. As an example, FBGs reflecting in the strongest portions of the source's spectrum can be placed near the beginning and end of an array, with reflectors at weaker wavelengths in the middle. During TDM, the EOM is made partially transmissive near the beginning and end of the time window, but is fully "on" in the middle. Transmission losses can be compensated for by integrating more TDM pulses when sampling FBGs at the far end of a sensor fiber.

Figure 6:
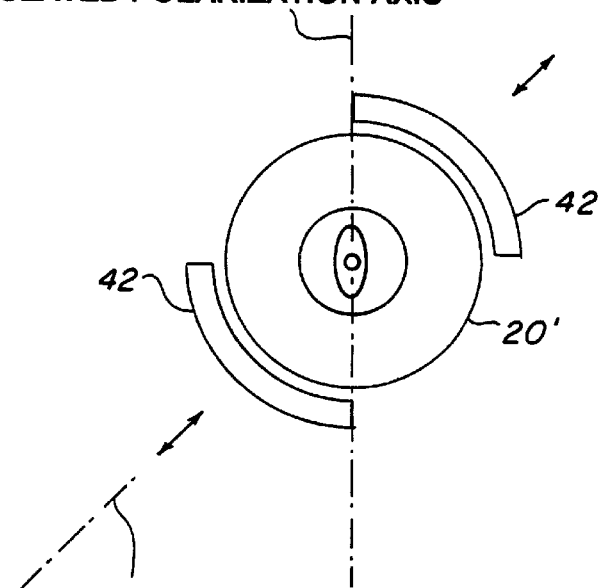
FIG. 6 is a view of an apparatus for correcting for polarization sensitivity in a light blocking device, for use in the invention.

Any EOM that acts on only one axis of polarization of the reflected light must have light in the other polarization axis extinguished either internally or externally to the modulator. Should the state of polarization (SOP) of the reflected signal be arbitrary, precautions must be taken to prevent loss of signal when the SOP of the signal is aligned with the extinguished axis. To simplify operation, light is typically coupled into such an EOM through a length of polarization-maintaining (PM) fiber. To ensure that all SOPs are sampled, a variable polarized wavefront retardation element is needed to modulate the reflected signal's SOP. A piezoelectrically driven clamp is mounted along the low-birefringence fiber close to the PM fiber to introduce compression transverse to the fiber core, and preferably at 45 degrees to both of the PM fiber's primary birefringent axes. Force applied by this squeezing clamp acts through the elasto-optic effect like a retardation plate to vary the SOP of in any component of the light polarized to align with either primary birefringent axis of the PM fiber. By rapidly modulating the squeezer with enough amplitude for many half-wave retardations, different light pulses will enter the PM fiber with different SOPs. Light polarized along or normal to the squeezing direction is unaffected by the device, but is sufficiently sampled by the EOM without further modification. By integrating pulses, some portion of all reflections will be effectively switched by the EOM. Referring to FIG. 6, a squeezing clamp 42 applies a modulated compression to a PM fiber 20', as shown be the arrows. Preferably, the modulated compression axis is at 45° to the modulated polarization axis.

Calculations can partially compensate for the finite contrast between the EOM's on and off states (this leakage limits the number of FBG reflections which can be effectively rejected without corrupting signals arriving in a selected time window). This finite contrast is quantified herein by the extinction ratio E=(transmission in the "on" state)/(transmission in the "off" state). As an example, consider an EOM with a 1000:1 extinction ratio, and 11 identical FBG arrays placed successively along a fiber. When detecting signals in one time window, 1/1000th of the signal from 10 other time intervals will mix with the intended signal, leaving a worse-case contrast of 100:1 for the intended signal. Modulator contrast may be accurately measured by launching light into the "unused" arm 25 of the fiber coupler, and measuring the signal with the modulator in its on and off states. The signal collected at a given time delay may then be corrected for light leakage by subtracting the leakage fraction from signals measured in all other time windows.

The signal correction used when measuring two FBG arrays which have been detected while using a light modulator with an extinction ratio E may be described by a mathematical approximation. The signals in this description refer to the entire set of amplitudes registered by the detector array. $S_A$ and $S_B$ are the reflected signals originating purely from arrays A and B, respectively, while the mixed signal $S_{A(B)}$ is the actual signal collected while selecting for $S_A$, because a small portion of $S_B$ is included due to the imperfect modulator:

$$S_{A(B)} = S_A + \frac{S_B}{E}.$$

If E is large (>1000), then the mixed signal is nearly equal to the ideal signal, so $S_B$ in the preceding equation may be approximated by $S_{B(A)}$:

$$S_{A(B)} = S_A + \frac{S_{B(A)}}{E}.$$

by rearranging, a good estimate of $S_A$ may be obtained from the measured signals:

$$S_A = S_{A(B)} - \frac{S_{B(A)}}{E}.$$

In general, many FBG arrays will exist on a single fiber, and the measured signals will include small components from each array element. Recovery of the unmixed signal SA from the measured signal $S_{A(BCD\ldots)}$ will take the form:

$$S_A = S_{A(BCD\ldots)} + \frac{-S_{B(ACD\ldots)} - S_{C(ABD\ldots)} - S_{D(ABC\ldots)} - \ldots}{E}.$$

This solution is then applied to extract the corrected signal for each array (e.g., $S_B$, $S_C$, etc.) If the measured signals are very stable (low noise and slowly varying), then the correction can be improved through iteration: first derive the improved values as with the preceding equation, then replace the mixed signals in the preceding equation (e.g., $S_{B(ACD\ldots)}$) with the derived values, and repeat the computations.

Alternative light modulators may be substituted for the EOM while still utilizing the capacity of the detector array for low-noise, high sensitivity detection and signal integration. A gain-gated waveguide (such as a solid state amplifier) could directly replace the EOM, or a fibercoupled microchannel plate image intensifier could be mated with the detector array, and its amplification voltage switched on and off to achieve optical gating.

Obviously, many modifications and variations of the present invention are possible in light of the above teachings. It is therefore to be understood that, within the scope of the appended claims, the invention may be practiced otherwise than as specifically described. For all of the embodiments of the invention described in this specification, it is to be understood that "preferred" and "typical" features of the invention are not necessarily to be considered essential to the invention.

What is claimed is:

1. An optical spectrometer for detecting a spectral signature of an input optical signal, comprising:
    a collimating lens having an optical axis and a focal plane, for collimating said input optical signal, and for focusing a dispersed signal into a line in said focal plane;
    an input optical system, for directing said input optical signal from an axial point source to said collimating lens;
    a diffraction grating, for chromatically dispersing said collimated input optical signal, positioned in the path, of collimated light from said collimating lens, oriented to return a majority of said dispersed light through said collimating lens; and
    a detector array, in said focal plane of, and nearly axial to, said collimating lens, wherein said collimating lens, said input optical system, said diffraction grating and said detector array are mechanically static, and wherein said detector array simultaneously integrates all of said input optical signals over the wavelength range of interest.

2. The optical spectrometer of claim 1, wherein said diffraction grating is adapted to have a blaze angle and line spacing to operate in Littrow configuration near said blaze angle, over the used wavelength range.

3. The optical spectrometer of claim 1, wherein said input optical system, diffraction grating, collimating lens, and detector array are configured for directing said input optical signal to said collimating lens, from said collimating lens to said grating, from said grating to said collimating lens, and from said collimating lens to focus on said detector array.

4. The optical spectrometer of claim 1, wherein said input optical system, diffraction grating, collimating lens, and detector array are configured so that said dispersed light diffracted from said grating propagates nearly symmetrically about the optical axis of said collimating lens, then strikes said detector array.

5. The optical spectrometer of claim 1, wherein said input optical system further comprises an input single mode optical fiber having an end in said focal plane and near said optical axis, configured for emitting said input optical signal.

6. The optical spectrometer of claim 5, wherein said input single mode optical fiber end is positioned not more than 1 mm from said detector array.

7. The optical spectrometer of claim 1, wherein said input optical system further comprises an input single mode optical fiber, configured for emitting said input optical signal, and a mirror for reflecting said emitted input optical signal to said collimating lens.

8. The optical spectrometer of claim 7, wherein said input optical fiber and mirror are configured so an image of an emitting end of said input optical fiber is in said focal plane of said collimating lens, and not more than 200 µm from the optical axis of said lens.

9. The optical spectrometer of claim 1, wherein said detector has a planar active face having an x-axis and a y-axis, wherein said detector is divided along said x-axis into a plurality of pixels, wherein said light scattered by said diffraction grating is scattered in a direction parallel to said x-axis of said detector, and wherein the height of said detector along said y-axis is approximately equal to a height of a light image of said scattered light at said focal plane.

10. The optical spectrometer of claim 9, wherein said height of said detector pixels along said y-axis is not more than 30 μm, and the width of said detector pixels along said x-axis is not more than 15 μm per pixel.

11. The optical spectrometer of claim 1, wherein said collimating lens has an aperture of less than 40 mm and a focal length less than 100 mm and collects at least 90% of the light diverging from a single mode optical fiber placed in its focal plane and positioned near and aimed along its optical axis, wherein said lens collimates said input signal, and transmits said collimated input signal to said diffraction grating, wherein said diffraction grating disperses said signal and returns it to said collimating lens, wherein said lens directs said returned signal into a line focused on said detector array, wherein over at least a 50 nm spectral range, the wavelength band reflected by a single FBG is focused to a spot smaller than about 15 μm for all spot images formed in the focal plane within at least 3 mm of the optical axis.

12. A fiber-based sensing system, comprising:
an optical fiber having an array of fiber Bragg gratings therein, each of said gratings being reflective at a selected wavelength, wherein said fiber is adapted for being mechanically or thermally coupled to one or more monitored structures;
a light source, for radiating light over a spectrum including each of said selected wavelengths, optically coupled to said optical fiber;
an optical spectrometer, optically coupled to said optical fiber, for detecting a spectral signature of reflected light from said fiber Bragg gratings, said optical spectrometer further comprising
an input optical system, for directing said reflected light as a point source input in the focal plane and near the optical axis of a collimating lens, said collimating lens being for collimating said input optical signal, and focusing the spectrally dispersed signal onto a detector array;
a diffraction grating in approximate littrow configuration, for chromatically dispersing and collimated input optical signal, positioned in the path of collimated light from and collimating lens, oriented to return a majority of said dispersed light through said collimating lens; and
a detector array, in said focal plane of said collimating lens, approximately axial with said collimating lens, wherein said optical spectrometer including said input optical system, said diffraction grating and said detector array are mechanically static, and wherein said detector array simultaneously integrates all of said input signals over the wavelength range of interest.

13. The fiber-based sensing system of claim 12, said strain sensing system further comprising:
a time selective light blocking device, positioned in the optical pathway between said optical spectrometer and said optical fiber having an array of fiber Bragg gratings.

14. The fiber-based sensing system of claim 13, wherein said light blocking device is an electro-optical modulator.

15. The fiber-based sensing system of claim 14, further comprising apparatus for correcting polarization sensitivity in said electro-optical modulator, said correcting apparatus comprising:

a variable force clamp coupled to said fiber between said electro-optical modulator and said FBG array, at about a 45° angle to a polarization axis of said electro-optical modulator, for varying the state of polarization of light reflected from said FBG array to said electro-optical modulator through the differential elasto-optic effect.

16. The fiber-based sensing system of claim 12, said strain sensing system further comprising:
a data collection system, for collecting data from said detector array; and
a data analysis system, for analyzing data collected from said spectrometer.

17. The fiber-based sensing system of claim 16, wherein said detector array has a planar active face having an x-axis and a y-axis, wherein said detector is divided along said x-axis into a plurality of pixels, wherein said light dispersed by said diffraction grating is dispersed in a direction parallel to said x-axis of said detector, and wherein the height of said detector along said y-axis is approximately equal to a height of a light image of said dispersed light at said focal plane, and wherein said data analysis system provides sub-pixel resolution.

18. The fiber-based sensing system of claim 17, wherein said data analysis system provides resolution of the spectral position of each signal peak to below 0.001 nm.

19. The fiber-based sensing system of claim 17, wherein said data analysis system provides positional resolution of each signal peak of below 0.01 pixel.

20. A method for computing a compounded centroid for stage signal data, said data comprising N discrete abscissa values, each abscissa value having a corresponding ordinate value, comprising the steps:
determining a centroid for said stage signal data;
selecting a stage W closest to said centroid;
selecting a number of data points O for an odd numbered data set;
selecting a number of data points E=O±1 for an even numbered data set;
selecting a number n of contiguous subsets of said stage signal data, wherein each of said n subsets has an average abscissa value $M_n$, a centroid $C_n$, and a difference $D_n = C_n - M_n$, wherein half plus or minus 1 of said subsets have E elements and the remainder of said subsets have O elements, wherein a first subset n=1 of said stage signal data having O elements has an integer average abscissa value $M_1 = W$, wherein a second subset of said stage signal data having E elements has an average abscissa value $M_2 = W+0.5$ if $C_1 - M_1 \geq 0$, $M_2 = W - 0.5$ if $C_1 - M_1 < 0$, and the remainder of such contiguous subsets, such that the number of subsets totals n, are centered alternately above and below W, each centered successively further from W by 0.5; and
computing a compounded centroid for said stage signal data $C_0$, wherein $$C_0 = \frac{\left(\frac{C_1}{|D_1|^r} + \frac{C_2}{|D_2|^r} + \ldots + \frac{C_n}{|D_n|^r}\right)}{\left(\frac{1}{|D_1|^r} + \frac{1}{|D_2|^r} + \ldots + \frac{1}{|D_n|^r}\right)}$$

wherein r is a preselected scaling factor and wherein each value for D is restricted to be not less than some preselected value.

21. A method for monitoring FBGs in an FBG array in a fiber, said FBG array comprising at least two subarrays, said method comprising:

optically coupling said FBG array to a pulsed optical light source and a spectrometer, said pulsed optical light source and said spectrometer, wherein said FBG array, said pulsed light source, and said spectrometer are components in the fiber-based sensing system of claim 12, and wherein a time selective light blocking device is positioned to selectively transmit light reflected from a selected subarray to said spectrometer, and to block light to said spectrometer between returns from all other of said subarrays;

launching periodic light pulses from said pulsed optical light source into said array;

selecting one of said subarrays for interrogation, and operating said time selective light blocking device to prevent transmission to said spectrometer, light reflected from subarrays other than said selected subarray;

collecting on said detector array all light reflected from said selected subarray;

analyzing said collected signal, said analysis including frequency division multiplexing.

22. The method of claim 21 wherein said detector array is adapted for integrating received optical signals from a plurality of pulses by accumulating on said detector array said received optical signal until said accumulated signal has a signal to noise ratio of greater than 100:1, before being read out.

23. The method of claim 21, further comprising:

performing signal correction to enhance contrast between reflected light signals from different subarrays A and B, wherein the signals from subarrays A and B are partially mixed due to an insufficient extinction ratio E in said light blocking device, said signal correction comprising:

measuring $S_{A(B)}$, a reflected light signal from subarray A, wherein said signal is partially mixed with a signal from subarray B;

measuring $S_{A(B)}$, a reflected light signal from subarray B, wherein said signal is partially mixed with a signal from subarray A;

correcting the measured signal $S_{A(B)}$ by estimating the actual signal reflected by subarray A, $S_A$ as:

$$S_A = S_{A(B)} - \frac{S_{B(A)}}{E}.$$

24. The method of claim 21, further comprising:

dynamically varying the transmittance of said light blocking device over the duration of each of said light pulses to eliminate or mitigate signal amplitude errors.

25. The method of claim 24, wherein said signal amplitude errors are errors from one or more of source amplitude nonuniformity, FBG reflectance nonuniformity, and length dependent losses in said fiber.

26. An optical spectrometer for detecting a spectral signature of an input optical signal, comprising:

a collimating lens having an optical axis and a focal plane, for collimating said input optical signal, and for focusing a dispersed signal into a line in said focal plane;

an input optical system, for directing said input optical signal from an axial point source to said collimating lens;

a diffraction grating, for chromatically dispersing said collimated input optical signal, positioned in the path, of collimated light from said collimating lens, oriented to return a majority of said dispersed light through said collimating lens; and one detector array, in said focal plane of, and nearly axial to, said collimating lens, wherein said collimating lens, said input optical system, said diffraction grating and said detector array are mechanically static, and wherein said detector array simultaneously integrates all of said input optical signals over the wavelength range of interest.

* * * * *